(12) United States Patent
Ho et al.

(10) Patent No.: US 11,442,592 B2
(45) Date of Patent: Sep. 13, 2022

(54) DISPLAY DEVICE FOR DRIVING PERSONAL INPUT DEVICE AND METHOD THEREOF

(71) Applicant: AMTRAN TECHNOLOGY CO., LTD., New Taipei (TW)

(72) Inventors: Che Chia Ho, New Taipei (TW); Chia Wei Lin, New Taipei (TW)

(73) Assignee: Amtran Technology Co., Ltd., New Taipei (TW)

( * ) Notice: Subject to any disclaimer, the term of this patent is extended or adjusted under 35 U.S.C. 154(b) by 0 days.

(21) Appl. No.: 17/210,896

(22) Filed: Mar. 24, 2021

(65) Prior Publication Data

US 2021/0303128 A1 Sep. 30, 2021

(30) Foreign Application Priority Data

Mar. 24, 2020 (TW) .................................. 109109868

(51) Int. Cl.
*G06F 3/04812* (2022.01)
*G06F 3/038* (2013.01)
*G06F 3/0482* (2013.01)

(52) U.S. Cl.
CPC .......... *G06F 3/04812* (2013.01); *G06F 3/038* (2013.01); *G06F 3/0482* (2013.01)

(58) Field of Classification Search
CPC .... G06F 3/04812; G06F 3/038; G06F 3/0482; G06F 3/0487
See application file for complete search history.

(56) References Cited

U.S. PATENT DOCUMENTS

| | | | | |
|---|---|---|---|---|
| 6,344,860 B1* | 2/2002 | Watts | ................... | G06F 3/0481 |
| | | | | 715/765 |
| 6,980,175 B1* | 12/2005 | Narayanaswami | ......................... | |
| | | | | G06F 21/6218 |
| | | | | 707/999.102 |
| 7,227,550 B2* | 6/2007 | Pasqualini | ............. | G09G 5/003 |
| | | | | 345/204 |
| 10,733,993 B2* | 8/2020 | Kudurshian | ............ | G10L 13/02 |

FOREIGN PATENT DOCUMENTS

| | | | | |
|---|---|---|---|---|
| TW | 201205347 A | 10/2002 | | |
| WO | 03019511 A2 | 3/2003 | | |
| WO | WO-03019511 A2 * | 3/2003 | ............. | G09G 5/003 |

OTHER PUBLICATIONS

Taiwanese Patent Office Official Action with Search Report dated Oct. 18, 2021 for corresponding Taiwanese Application No. 11021009520.

* cited by examiner

Primary Examiner — Cao H Nguyen
(74) Attorney, Agent, or Firm — Rosenberg, Klein & Lee (57) ABSTRACT

The present invention provides a method for driving personal input device. The method is executed by a display. The display is connected with a personal input device. A first processing unit of the display drives the personal input device. The display receives a first event message from the personal input device. The first processing unit processes the event message to give a first event parameter, and updates the status of a cursor in a display picture according to the first event parameter. In addition, the first processing unit processes the first event message to generate a second event message, and transmits the second event message to an electronic device via a display data channel/command interface (DDC/CI).

20 Claims, 5 Drawing Sheets

DISPLAY DEVICE FOR DRIVING PERSONAL INPUT DEVICE AND METHOD THEREOF

FIELD OF THE INVENTION

The present invention relates generally to a device driving method, and particularly to a method for driving personal input device.

BACKGROUND OF THE INVENTION

Nowadays, the personal input devices of a computer include mouse, keyboard, and other devices generating input signals. The personal input devices, such as mouse and keyboard, mostly adopt the universal serial bus (USB) connector to connect to the USB port of a computer host. The event signals generated by these personal input devices need to be processed by the processor inside the computer. For example, the movement, clicking, and dragging of a USB mouse are output to the processor of the computer, which will process these event signals and transmit the processed results to the graphic processor of the computer host. The graphic processor will update the picture signal according to the processed results. Then the updated picture signal is transmitted to the display for displaying, enabling the user to see the changes of the cursor on the display caused by the user's operations on the personal input device. If the loading of the main processor, memory, or graphic processor in the computer host are too heavy currently, the event signals from the personal input device usually cannot be processed by these components in real time, such that the results corresponding to the user's operations on the personal input device will not be shown in the display picture immediately. Because the technology for manufacturing display devices is well developed and the electronic sport industry are rapidly grown in recent years, the computer displays with large scale, high resolutions, and high refresh frequency display panels become the trend on the market. Unfortunately, the process of the event signals from the personal input devices is still not improved. Thereby, the display lag problems caused by delays in signal processing as described above still exist.

Besides, there are many display devices with built-in USB hubs available on the market. Various USB devices can be connected to the USB ports on such display devices through USB cables and thereby indirectly connected to the computer host for transmitting or receiving signals. The wires and cables connecting to the computer hosts can be reduced and the mess of tangled wires and cables can be prevented, whereby the usage convenience is improved.

Nonetheless, such display devices with built-in USB hubs cannot process the signals received from the USB devices independently. Instead, the display devices only act as an intermediate node in signal the transmission process which forwards the signals to the computer host for processing. Thereby, when the operation loading of the computer host is heavy, the display lag problems still occur. Moreover, in order to work as the external USB hub of the computer host, an additional USB cable, as well as the existed HDMI or display port cable, is required to be connected between the USB ports of the display device and the computer host for transmitting USB signals separately. If multiple USB devices are connected to this type of display device which transmit USB signals of multiple USB devices to the computer host or receive signals for multiple USB devices from the computer host concurrently, the bandwidth of the transmission lines in the single USB cable connecting the display device and the computer host might be occupied by the massive signals and resulting in transmission delays, whereby the computer host cannot receive, process and transmit the user's input signals that should be processed at real time. Eventually the process lag problem still occurs. As the abovementioned issues are raised, the currently existed display devices with built-in USB hubs do not further integrate signal processing and transmission functions for the USB devices. The drawback of inability to provide instant responses on the display while a user is operating personal input device is still not solved.

SUMMARY

An objective of the present invention to provide a method for driving personal input device. Personal input devices connected to the display devices which have processing units processing the input signals directly for reducing the user's feeling of display lag for the display devices and personal input devices. In addition, signal transmission between the display devices and the computer hosts can be performed using existed connections of signal transmission cables, which reduces the cost for connecting additional wires or cables. By reducing cables for connecting to electronic devices, disorder owing to excess external wires can be avoided. For applications requiring the user to make fine and accurate operations on the personal input devices, the driving method according to the present invention can maintain consistent operability in any condition.

To achieve the above objective, the present invention provides a signal processing method of a display device, comprises steps of: the display device connecting with a personal input device, and a first processing unit within the display device driving the personal input device; the display device receiving a first event message from the personal input device, wherein the first event message is generated by the personal input device corresponding to an operation made by a user; the first processing unit processing the first event message to generate a first event parameter and updating graphical status of a cursor in a display picture of said display device, wherein said display picture is provided in a picture signal transmitted by an electronic device; the first processing unit processing the first event message to generate a second event message and transmitting the second event message to the electronic device; and the display device displaying the display picture, and the updated graphical status of the cursor in said display picture.

According to an embodiment of the present invention, the method further comprises steps of: the first processing unit acquiring a second event parameter according to a first event message; the first processing unit converting the second event parameter to the second event message according to the DDC/CI protocol; and the display device transmitting the second event message to the electronic device.

According to an embodiment of the present invention, the method further comprises a step of: the display device receiving the picture signal from the electronic device, wherein a second processing unit in the electronic device recovers the second event parameter from said second event message following said display data channel/command interface protocol and processing software executing programs in execution to generate the picture signal.

According to an embodiment of the present invention, the method further comprises steps of: determining if the first event parameter corresponds to an on-screen display menu; and if said first event parameter corresponds to said on-screen display menu, the first processing unit graphical information of the on-screen display menu in the display picture corresponding to said first event parameter.

According to an embodiment of the present invention, the first event message includes a device descriptor, a configuration descriptor, a string descriptor, an interface descriptor, and an endpoint descriptor.

According to an embodiment of the present invention, the first event parameter includes coordinate information of the cursor in said display picture.

According to an embodiment of the present invention, the personal input device is connected to the display device via a USB port, a parallel port, or a wireless communication transceiver.

According to an embodiment of the present invention, the electronic device is a personal computer, a multimedia player, or a game console.

According to an embodiment of the present invention, the second event message includes a button event, a cursor event, a scroll-wheel event, and a control event.

According to an embodiment of the present invention, the on-screen display menu includes options of display settings for the display picture and a display region of the on-screen display menu in the display picture.

To achieve the above objective, the present invention provides a display device, which comprises a display panel, a device connector, and a first processing unit. The first processing unit is connected electrically to the display panel and the input device connector, and driving a personal input device connected to the input device connector and receives a first event signal generated by the personal input device via the input device connector.
wherein said first processing unit receives a picture signal from an electronic device using a transmission protocol, and said picture signal including a graphical status of a cursor controlled by said personal input device, wherein said first processing unit processes said first event message of said personal input device to generate a first event parameter and updates the cursor graphical status of the cursor in said picture signal according to said first event parameter, and said first processing unit outputs said updated picture signal to said display panel for displaying, wherein said first processing unit processes said first event message to generate a second event message and transmits said second event message to said electronic device via a display data channel/command interface.

According to an embodiment of the present invention, the first processing unit acquires a second event parameter according to said first event message and converts a second event parameter to said second event message according to a display data channel/command interface protocol.

According to an embodiment of the present invention, the picture signal is generated by a second processing unit in the electronic device, the second processing unit recovers the second event parameter from the second event message and processes the second event parameter with software programs in execution to generate the picture signal.

According to an embodiment of the present invention, the first processing unit determines if the first event parameter corresponds to an on-screen display menu, and the first processing unit generates graphical information of the on-screen display menu in the display picture corresponding to the first event parameter if the first event parameter corresponds to the on-screen display menu.

According to an embodiment of the present invention, the first event message includes a device descriptor, a configuration descriptor, a string descriptor, an interface descriptor, and an endpoint descriptor.

According to an embodiment of the present invention, the first event parameter includes coordinate information of the cursor in the display picture.

According to an embodiment of the present invention, the input device connector is a USB port, a parallel port, or a wireless communication transceiver.

According to an embodiment of the present invention, the electronic device is a personal computer, a multimedia player, or a game console. The second event message includes a button event, a cursor event, a scroll-wheel event, and a control event.

According to an embodiment of the present invention, the on-screen display menu includes options of display settings for the display picture and a display region of the on-screen display menu in the display picture.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
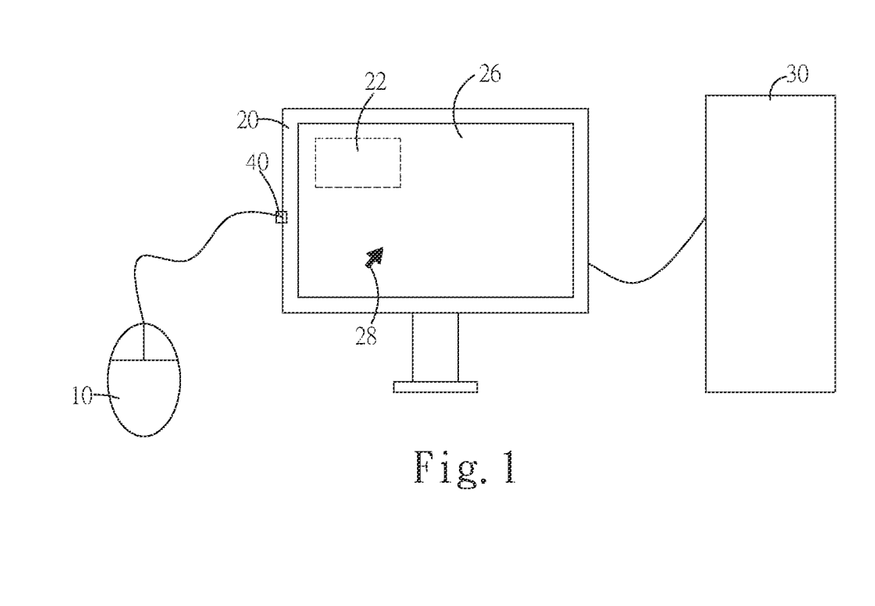
FIG. 1 shows a schematic diagram of the connection status of the personal input device according to an embodiment of the present invention.

Please refer to FIG. 1, which illustrates a schematic diagram of the connections between the devices according to an embodiment of the present invention. As shown in FIG. 1, a personal input device 10 is connected to a display device 20 and the display device 20 is electrically connected to an electronic device 30. The display device 20 includes a display panel 26, a cursor 28, and a first processing unit 22. In addition, the electronic device 30 exchanges transmission signals with the display device 20 via the high definition multimedia interface (HDMI) or the DisplayPort (DP) transmission cable. The electronic device 30 transmits a picture signal to the display device 20 via the transmission cable and the display device 20 transmits the processed first event messages 12 of the personal input device to the electronic device 30 using a display data channel/command interface (DDC/CI) protocol via the same transmission cable. The electronic device 30 receives the first event message 12, processes the first event message 12 with the corresponding program and hence generates the new picture signal M. The display device 20 receives and displays the picture signal M from the electronic device 30. The display device 20 includes the first processing unit 22 to execute programs which is capable of processing the first event message 12 generated by the personal input device 10 in real time, such that the location, action, or shape of the cursor 28 can be updated on the display screen immediately. Thus, the display device 20 does not need to wait for the electronic device 30 to update the graphics of the cursor in the picture signal M.

The first processing unit 22 in the display device 20 is electrically connected to the display panel 26 and a signal input port 40, drives a personal input device 10 connected to the signal input port 40, and receives the first event signal 12 generated by the personal input device 10 via the signal input port 40. The first processing unit 22 receives a picture signal M from an electronic device 30 using a transmission protocol. The picture signal M includes graphical status information of the cursor 28 controlled by the personal input device 10. The first processing unit 22 processes the first event message 12 to generate a first event parameter 122, and updates the graphical status of the cursor 28 in the picture signal M according to the first event parameter 122. The first processing unit 22 outputs the updated picture signal M to the display panel 26 for displaying.

In addition, the first processing unit 22 processes the first event message 12 to generate a second event message 24, and transmits the second event message 24 to the electronic device 30 via DDC/CI protocol.

According to an embodiment of the present invention, the first processing unit 22 can be a single integrated processing chipset or a combination of multiple processors. In addition to receiving the picture signals M transmitted by the electronic device 30 and producing the display pictures, the first processing unit 22 further drives the personal input device 10, displays an on-screen display (OSD) interface, and adjusts the functional configuration and display settings of the display device 20, whereby the first processing unit 22 updates the display pictures according to the adjusted settings and enables the display device 20 to display the updated display pictures. In addition to the mouse as shown in FIG. 1, the personal input device 10 can also be a track ball, a touch pad, a body motion or gesture sensor, a keyboard, or other input device in various forms.

According to an embodiment of the present invention, in addition to the desktop computer as shown in FIG. 1, the electronic device 30 can also be a notebook computer, a minicomputer, a microcomputer, a server, or general-purpose computers in other forms. Besides, the display device 20 and the electronic device 30 can be integrated to form an integral computer device.

Figure 2A:
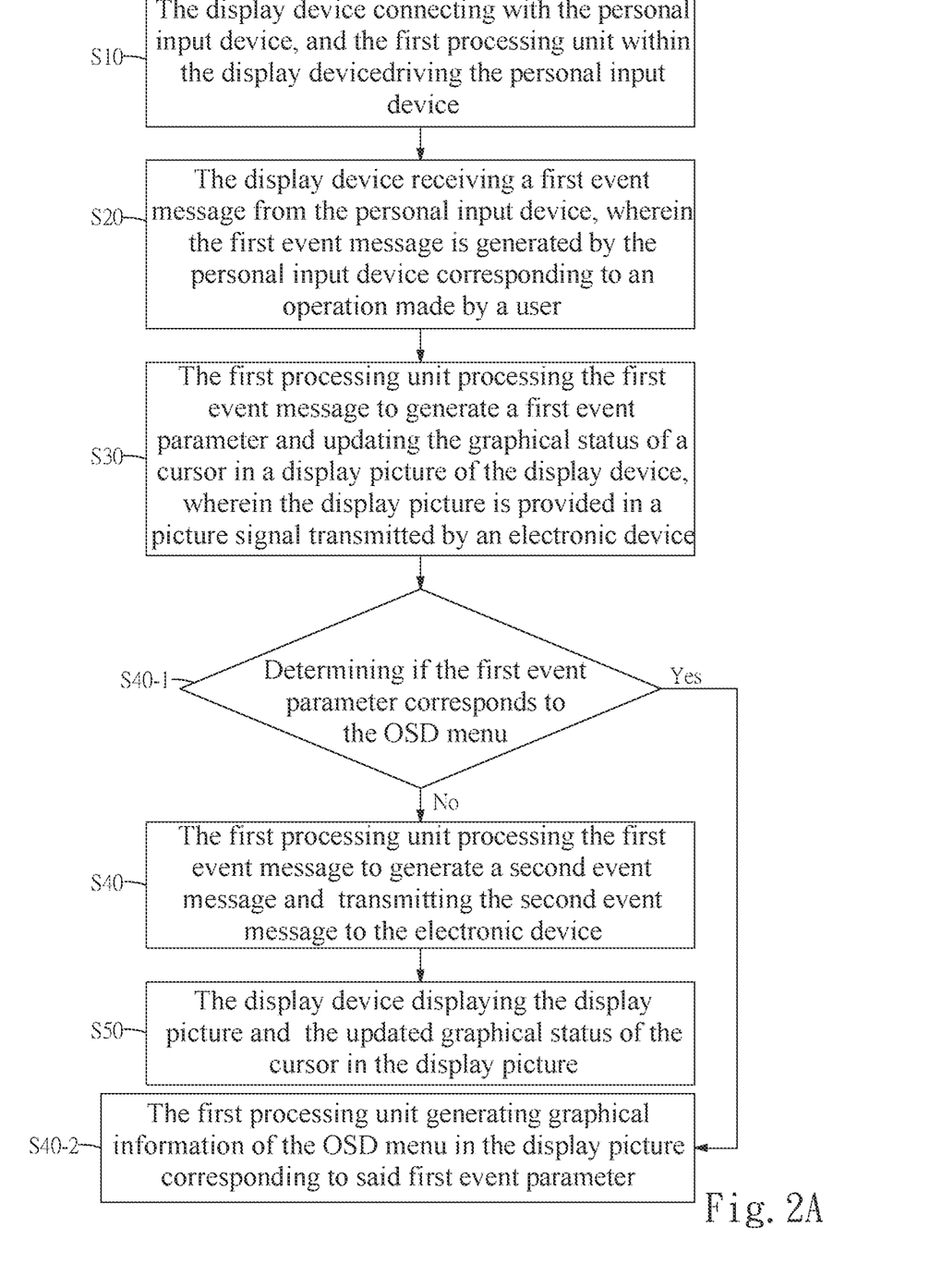
FIG. 2A shows a flowchart of the method for driving the personal input device according to an embodiment of the present invention.

Next, please refer to FIG. 2A, which illustrates a flowchart of the method for driving the personal input device according to an embodiment of the present invention. As shown in FIG. 2A, the driving method according to the present invention comprises steps of:

Step S10: The display device connecting with the personal input device and the first processing unit within the display device driving the personal input device;

Step S20: The display device receiving a first event message from the personal input device, wherein the first event message is generated by the personal input device corresponding to an operation made by a user;

Step S30: The first processing unit processing the first event message to generate a first event parameter and updating the graphical status of a cursor in a display picture of the display device, wherein the display picture is provided in a picture signal transmitted by an electronic device;

Step S40: The first processing unit processing the first event message to generate a second event message and transmitting the second event message to the electronic device; and Step S50: The display device displaying the display picture and the updated graphical status of the cursor in the display picture.

Figures 3A, 3B:
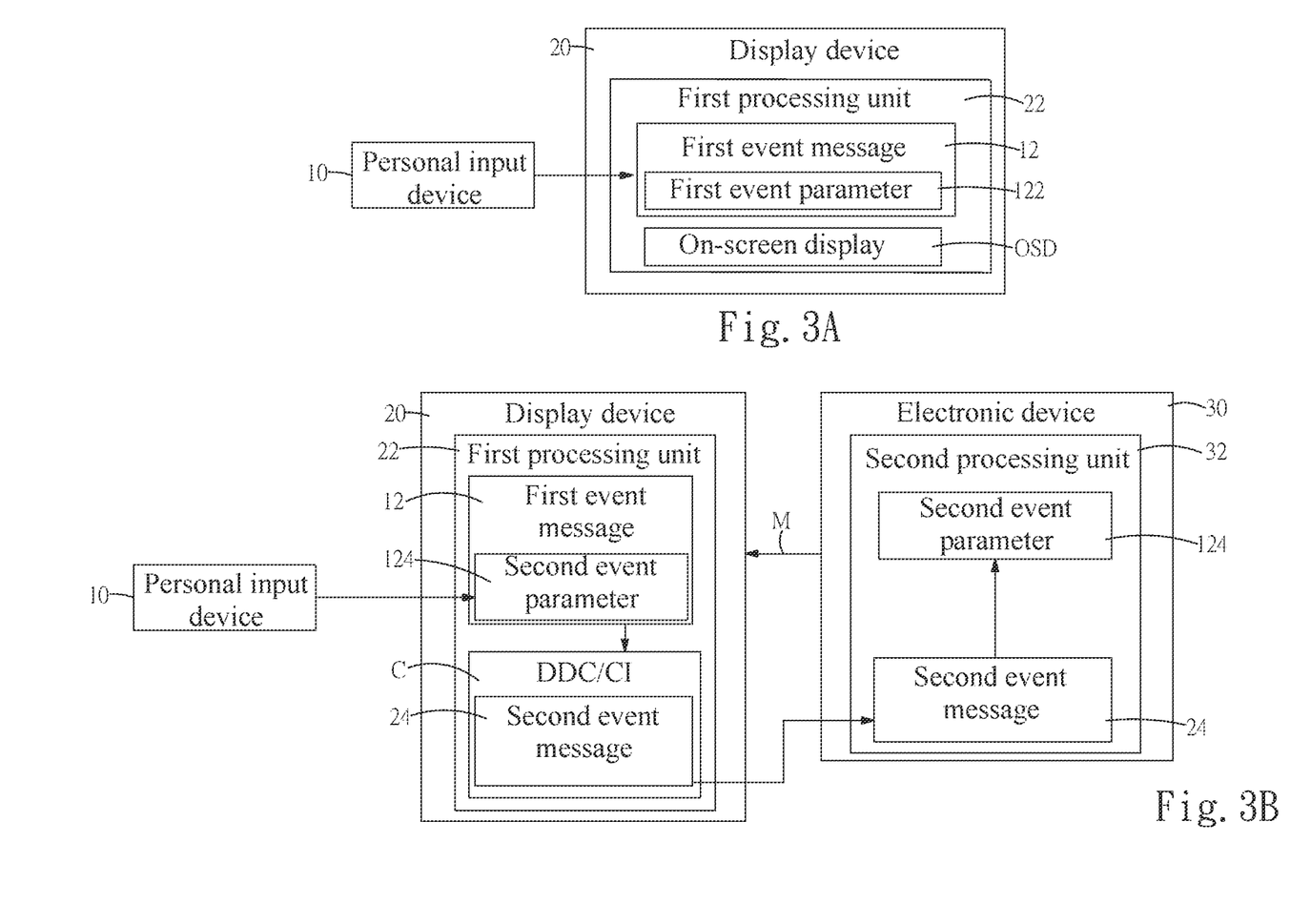
FIG. 3A shows a schematic diagram of the usage status of method for driving the personal input device according to an embodiment of the present invention.
FIG. 3B shows a schematic diagram of the usage status of method for driving the personal input device according to another embodiment of the present invention.

First, please refer the steps S10 to S40 to the FIG. 3A, which illustrates a schematic diagram showing the display device driving the personal input device according to an embodiment of the present invention. As shown in FIG. 2A, at the step S10, a display device 20 is connected with a personal input device 10. A first processing unit 22 of the display device 20 drives the personal input device 10. The user can operate the personal input device 10 to control a cursor 28 shown in the display pictures of the display device 20. The personal input device can be a track ball, a touch pad, a body motion or gesture sensor, a keyboard, or other input device in various forms. According to an embodiment of the present invention, the personal input device 10 is connected to the display device 20 using a USB connection cable. Nonetheless, the present invention is not limited to USB connection cable; other signal communication cable or wireless communication protocol can be applied to the present invention as well. At the step S20, the display device 20 receives a first event message 12 from the first personal input device 10. The first personal input device 10 generates the first event message 12 according to the operational behaviors of a user on the personal input device 10 and transmits the first event message 12 to the display device 20. For example, when the personal input device 10 is a mouse, as the user moves, clicks, drags, or rolls the scroll wheel of the mouse, the personal input device 10 will generate the first event message 12 corresponding to these operational events in real-time. As the personal input device 10 is other types of personal input devices, likewise, the first event message 12 will be generated immediately in response to the operation events made by the user and transmitted to the display device 20. At the step S30, the first processing unit 22 processes the first event message 12 to generate a first event parameter 122, and updates the graphical status of the cursor 28 in a display picture according to the first event parameter 122. The display picture is transmitted from an electronic device 30 to the display device 20 via a transmission protocol. At the step S40, the first processing unit 22 processes the first event message 122 to generate a second event message 124, and transmits the second event message 124 to the electronic device 30 via DDC/CI. In the step S50, the display device 20 updates the display picture and displays the updated graphical status of the cursor 28 in the display picture, including the updated location or other graphical status of the cursor 28. Following the step S30, the method further comprises steps of:

Step S40-1: Determining if the first event parameter corresponds to the OSD menu; and Step S40-2: if said first event parameter corresponds to said on-screen display menu, the first processing unit generating graphical information of the on-screen display menu in the display picture corresponding to said first event parameter.

More specifically, if the first event parameter 122 corresponds to the OSD menu, for example, the coordinates or movements of the cursor is in the region where the OSD menu is displayed on the screen and the user clicks the personal input device to operate, the first processing unit 22 generates and executes the command for adjusting display function or parameter settings, based on the location in the displayed OSD menu region where the first event parameter 122 corresponds to, in order to set the display device 20 with adjusted settings. To elaborate, the OSD menu includes options of adjusting the display parameter settings, such as hue, brightness, and contrast ratio, or function options, such as display mode, input source of the picture signals, or the division or geometrical shape settings for dividing display regions for different use. The OSD menu can provide various the combinations of any function options and parameter settings. According to an embodiment of the present invention, the OSD menu also includes options for adjusting the function or configuration settings of the personal input device 10. For example, a submenu under the OSD menu can include options for adjusting settings of various personal input devices 10, such as the moving speed and the interval of time period for determining double clicks, and the main button setting of a mouse, the sensitivity settings of a touch pad, or the gesture commands of a gesture sensor. According to an embodiment of the present invention, the display pictures of the display device 20 may include the display region of the OSD menu, which is not always displayed on the display screen for saving space of the display screen. As the user presses a button disposed on the housing of the display device 20 or operates the personal input device 10 to trigger the command to call the OSD menu out, the first processing unit 22 will enable the display region to be displayed in the display picture. The user can control the personal input device 10 to move the cursor 28 to the display region of the OSD menu in the display picture, and use the personal input device 10 to control the cursor 28 to operate, select, or adjust the options of function or parameter settings within the OSD menu.

According to an embodiment of the present invention, the first processing unit 22 processes and generates the graphic layer and the location of the cursor 28, which is controlled by the personal input device 10, and the graphic layer of the OSD menu displayed in the display picture. For example, the graphic layer of the cursor 28, which is controlled by the personal input device 10, is set by the first processing unit 22 as the topmost layer in the display picture while the graphic layer of the OSD menu is set as next level to the cursor 28 and be overlaid. When the user operates the personal input device 10 to control and move the cursor 28 to the display region of the options in the OSD menu, the first processing unit 22 will update the display picture that the graphic layer of the cursor 28 overlays the display region of the OSD menu in the display picture, rather than the prior art display device which overlays the OSD menu on the cursor 28 and the display picture. In addition, when the user controls the personal input device 10 to make the cursor 28 operate, select, or adjust the options of function or parameter settings in the OSD menu, the first processing unit 22 will process such OSD menu setting events according to the location of the cursor 28 on the options of OSD menu, the user's operational events of the personal input device 10, and the corresponding options of function or parameter settings in the OSD menu. The corresponding options of the function or parameter settings in the OSD menu will be adjusted by the first processing unit 22 accordingly. Thereby, the display device 20 can independently process the operational commands from the personal input device 10 on the cursor 10 in the display picture and the operations of the cursor 28 on the OSD menu, so the function or parameter settings of the display device 20 can be adjusted according to the user's operations on the personal input device 10. The first processing unit 22 of the display device 20 does not need to transmit the operational events of the personal input device 10 or the adjusted settings in the OSD menu to any external devices for processing, which is different from the prior art display devices. The prior art display devices require to transmit the operational commands of the personal input devices to the computer for processing, wherein the personal input devices in such system cannot adjust the option settings in OSD menu of the prior art display devices, and prior art display devices cannot process and update the location and status of the cursor in the display picture according to the operation events of the personal input devices.

According to an embodiment of the present invention, the electronic device 30 acts as the source of the picture signal for the display device 20. The graphic layer of display picture, which is generated from the picture signal M output to the display device 20, is set as the level below the cursor 28 and the OSD menu. When the OSD menu is called and displayed on the display picture, the first processing unit 22 overlays the OSD menu on the graphic layer of the picture signal M provided by the electronic device 30. Alternatively, the graphic layers of the OSD menu and the picture signal M provided by the electronic device 30 can be displayed concurrently using picture-in-picture mode, picture-by-picture mode, or other customized functions to arrange regions in display picture, wherein the OSD menu can include the options for setting the display mode or display region of the OSD menu. No matter which function is adopted to display the OSD menu, the user can use the personal input device 10 to control the cursor 28 and operate in the display region of the OSD menu as well as in the display region of the picture signal M from the electronic device 30.

According to an embodiment of the present invention, the first processing unit 22 dynamically adjusts the display region of the OSD menu. For example, if the cursor 28 controlled by the personal input device 10 is not moved to the display region of the OSD menu, the display region of the OSD menu is minimized or replaced by a representative icon shown at one of the edges of the display picture, so the operations of the cursor 28 controlled by the user in the display picture will not be interfered or blocked by the OSD menu. When the cursor 28 controller by the personal input device 10 is moved to the minimized display region or the representative icon of the OSD menu, the display region of the OSD menu will be enlarged to full size and the options of the OSD menu will be displayed. According to an embodiment of the present invention, when the options of the OSD menu are displayed, the first processing unit 22 dynamically adjusts the display region and content of the OSD menu according to the operation events from the personal input device 10 operated by the user. For example, the graphic layer of the option or parameter setting displayed under the cursor's location may be temporally enlarged in the OSD menu. The detailed description of the option or parameter setting displayed under the cursor's location may be temporally displayed with the option or parameter setting in the OSD menu. The options or parameter settings, which are not under the cursor's location, may be temporally shrunk, hided, faded, or darkened in the OSD menu.

In the step S50, the first processing unit 22 updates the display picture of the display device 20 according to the first event parameter 122, including updating the location or graphical status of the cursor 28. For example, the first event message 12 received by the display device 20 is the user moving the personal input device 10 to certain location. The first event parameter 122 includes the new coordinates or movements of the cursor 28 in the display picture of the display device 20. Alternatively, the first event message 12 is the user clicks the left or right button of the personal input device 10. The first event parameter 122 includes the graphical changes of the cursor 28 while the personal input device 10 being clicked, and no matter which display region the cursor 28 is located, the first processing unit 22 will process and update the display picture in real-time. According to an embodiment of the present invention, the first processing unit 22 can update the cursor 28 and a portion of the display region within the display picture concurrently. For example, the graphical changes in the display region of the OSD menu and the cursor 28 can be updated together based on the user's operations.

Figure 2B:
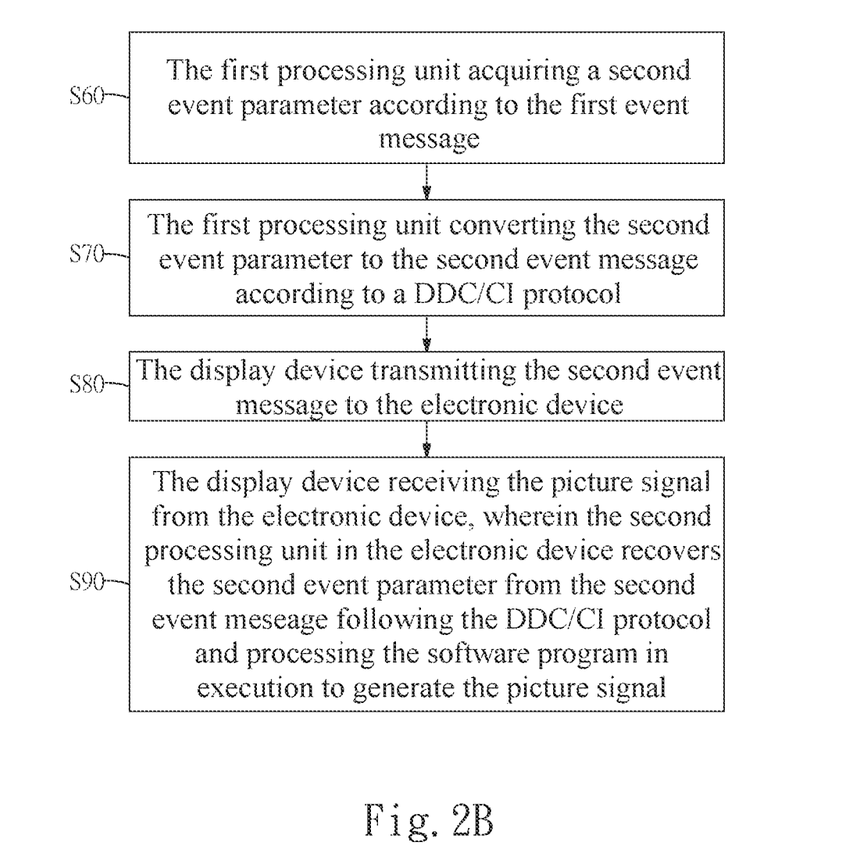
FIG. 2B shows a flowchart of the method for driving the personal input device according to another embodiment of the present invention.

FIG. 2B illustrates a flowchart of the method for driving the personal input device according to another embodiment of the present invention. According to an embodiment of the present invention, the step S40, wherein the first processing unit processes the first event message to generate a second event message, further comprises steps of:

Step S60: The first processing unit acquiring a second event parameter according to the first event message;

Step S70: The first processing unit converting the second event parameter to the second event message according to a DDC/CI protocol;

Step S80: The display device transmitting the second event message to the electronic device; and Step S90: The display device receiving the picture signal from the electronic device, wherein the second processing unit in the electronic device recovers the second event parameter from the second event message following the DDC/CI protocol and processing software programs in execution to generate the picture signal.

Please refer the steps S60 to S90 to FIG. 3B, which illustrates a block diagram of the system performing the method for driving the personal input device according to another embodiment of the present invention. As shown in the FIG. 3B, the first processing unit 22 processes the first event message 12 to generate a second event parameter 124. The first processing unit 22 converts the second event parameter 124 to a second event message 24 according to a DDC/CI protocol, and transmits the second event message 24 to the electronic device 30 via the same transmission cable. The electronic device 30 is the source of the picture signal M, which provides the display picture currently displayed on the display device 20, and includes the second processing unit 32. The second processing unit 32 can be a single integrated processing chip or a combination of multiple processors for executing the application programs installed in the electronic device 30. At the step S90, the second processing unit 32 receives and processes the second event message 24 from the display device 20 according to the DDC/CI protocol, and eventually retrieves the second event parameter 124. Then the second processing unit 32 processes the executing application program with the second event parameter 124 and generates the picture signal M.

The signals transmitted between the display device 20 and the electronic device 30, including the second event message 24 and the picture signal M, are through the HDMI or the DP interfaces. Thereby, the display device 20 and the electronic device 30 are required to have compatible multimedia signal connectors, which can be connected using a single multimedia signal cable for exchanging signals.

To elaborate, the second event message 24 is transmitted following the DDC/CI protocol, which shares the same transmission lines with the common display data channel (DDC) protocol for transmitting the data of the display device 20. The connection interfaces and transmission cable of HDMI or digital visual interface (DVI) protocols can incorporate the DDC protocols. Except the HDMI and DVI protocols, the display device 20 and the electronic device 30 of the present invention can be connected using other compatible transmission protocols that transmit the picture data and DDC data signals. Furthermore, the physical data, such as the extended display identification data (EDID), of the display device 20 will be transmitted to the electronic device directly via the DDC communication 84 and enabling plug-and-play functionality for the display device 20. Thereby, after the display device 20 is connected to the electronic device 30, the electronic device 30 can directly generate the corresponding picture signal M according to the physical data of the display device 20 and receive the first event message 12 of the personal input device 10, which is transmitted by the display device 20, without any additional settings made by the user. The electronic device 30 only needs to install the operating system supporting the DDC/CI communication 82, such as the Windows or the Linux operating system, and the user does not need to install any additional customized or specialized software or hardware. The operating system of the electronic device 30 can acquire the information from the display device and the display adaptor and automatically complies with the most suitable settings matching the display device 20. Alternatively, the electronic device 30 can switch to a preset display mode for achieving the optimum effect of the display picture on the display device. The display device 20 is compatible to the DDC/CI protocol and the communication protocol connecting to the personal input device 10, for example, the USB, PS/2, Wi-Fi, or Bluetooth communication protocol. The user can connect the connector of the personal input device 10 to the display device 20 directly. Alternatively, the personal input device 10 and the display device 20 can build a connection wirelessly. As described above, the first processing unit 22 of the display device 20 can independently perform adjustments to various display settings, such as hue, contrast ratio, or brightness of the display device 20. The user can use the personal input device 10 to operate the OSD menu, instead of using the buttons disposed on the housing of the prior arts display devices.

Figure 4A:
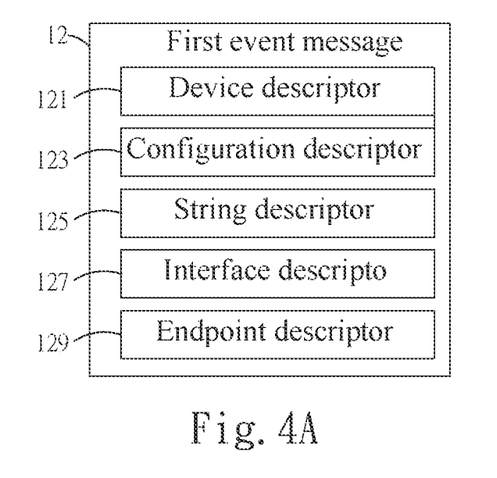
FIG. 4A shows a schematic diagram of the first event message according to an embodiment of the present invention.

Furthermore, please refer to FIG. 4A, which illustrates an exemplary block diagram of the first event message according to an embodiment of the present invention. As shown in FIG. 4A, the aforementioned first event message 12 includes a device descriptor 121, a configuration descriptor 123, a string descriptor 125, an interface descriptor 127, and an endpoint descriptor 129 generated by the personal input device 10 according to the human interface device (HID) protocol. The first event message 12 uses these HID descriptors to define the input event of the personal input device 10 which is operated and controlled by the user. The HID protocol provides the descriptions and definitions of the fixed byte arrays corresponding to the event messages from the personal input device 10, including definitions of the type of the personal input device 10, the number of supported event types, the size of messages, and the definitions of all byte and bit sections in messages. The first event message 12 generated by the personal input device 10 can be interpreted rapidly by the display device 20 with the HID protocol.

Figure 4B:
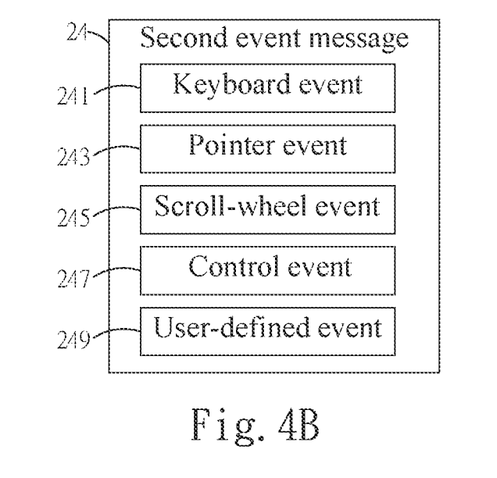
FIG. 4B shows a schematic diagram of the second event message according to an embodiment of the present invention.

Furthermore, please refer to FIG. 4B, which illustrates an exemplary block diagram of the second event message 24 according to an embodiment of the present invention. The personal input device 10 corresponding to the second event message 24 in the embodiment of FIG. 4B is a mouse. The second event message 24 includes a button event 241 defining the button ID and the button status, a cursor event 243 defining the cursor position and the cursor status, a scroll-wheel event 245 defining the wheel ID and the wheel status, a control event 247 defining the movement, the click, the rolling, and the dragging status, and a custom event 249 defining other custom defined data. Each time the display device 20 receives any of the above-mentioned events from the personal input device 10, which belong to the second event message 24, the display device 20 transmits a second event message 24 to the electronic device 30 correspondingly.

According to an embodiment of the present invention, the electronic device 30 is a personal computer, a multimedia player, or a game console. According to an embodiment of the present invention, the personal input device 10 is connected to the display device 20 via a signal input port 40, which is a USB port, a PS/2 port, a Bluetooth transceiver, a wireless network transceiver, or other applicable connector.

According to an embodiment of the present invention, the user can connect the personal input device 10, such as a mouse, to the display device 20 via the signal input port 40, such as the USB port. The display device is connected to the electronic device 30, such as the personal computer host, via the signal communication cable. The personal computer host will transmit the picture signal M to the display for displaying. When the user controls the mouse to move the cursor to a displayed content in the display picture and clicks the button of the mouse, the mouse generates the first event message 12 and inputs the first event message 12 to the display device. The display device includes the first processing unit 22, such as a chipset, which receives and interprets the first event message 12 to generate the first event parameter 122. If the current operation event is the mouse operating the cursor at the OSD menu, the first event parameter 122 will indicate the operation event and display device will update the display picture showing the operation directly, such as the cursor adjusting the display settings in the OSD menu corresponding to the operation of the mouse. Alternatively, if the current operation event is a simple movement of the mouse, the first event parameter 122 will indicate the moving event and the display device will update the display picture showing the movement of the cursor, such as updating the cursor's location in the display picture according to the movement of the mouse.

If the current operation event is the mouse being moved or clicked, the display device will convert the second event parameter 124, which indicates the operation event interpreted from the first event message 12, to the second event message 24 and transmit the second event message 24 to the personal computer host via the HDMI cable connected between the display device and the personal computer host. The processing unit in the personal computer host, i.e. the second processing unit 32, will interpret the second event message 24, retrieve the operational event, and process the application program with the operational event correspondingly. The personal computer host will generate the new picture signal M according to the processed application program and transmit the picture signal M to the display device via the HDMI cable. The single-chip processing unit of the display device receives the picture signal M. Before the display device displays the picture signal M, a new operational event received by the display device will be retrieved according to the newly-received first event message 12. In addition, the display picture will be updated to display the graphical change of the cursor following the new operational event, or the display picture will be updated following the adjustments in display settings caused by the new operational event. Meanwhile, the new second event message 24 will be generated by the display device according to the newly-received operational event and transmitted to the personal computer host for processing.

According to the above description, the present invention discloses a method for driving personal input device of a display device. The personal input device can be a USB compatible personal input device or the personal input devices with other connection capabilities. The event signal of the personal input device is received and processed by the processing unit inside the display device for updating graphical changes in display picture, such as the cursor location and status in the display picture. The display device can display the display picture updated by the processing unit inside the display, such that the latency conceived by the user can be reduced. For the users requiring precise controls on the personal input devices, the method for driving personal input device according to the present invention provides the users to conceive instant feedbacks on the cursors in the display pictures caused by the personal input devices. In addition, the event signals generated by the personal input devices can be transmitted using the existed video signal cable connecting the display device and the electronic device providing picture signal, such as the computer host. No USB signal cable is required to connect to the computer host, and hence the competition between the signals from the display device and other USB devices, which also connect to the computer host, for the transmission bandwidth can be avoided. The technology disclosed in the present invention can reduce the display lag for operations made by the personal input device and provide fluent operating experience for users. Besides, the technology of the present invention can be integrated with the firmware of the display device, so the users can use the personal input device to operate and control the OSD menu of the display device, therefore providing more intuitive operations. Moreover, the technology disclosed in the present invention uses existing display data channel to transmit the event signal from the personal input device. When the display device receives the picture signal via the display data channel, the event signals of the personal input device can be transmitted to the computer host via the same transmission interface concurrently. Accordingly, no additional USB signal cable is required for connecting the display device and the computer host as the prior arts, and the latency caused by the bandwidth occupied by other USB devices connecting to the computer host can be avoided.

What is claimed is:

1. A signal processing method of a display device, comprising steps of:
   said display device connecting with a personal input device, and a first processing unit within said display device driving said personal input device;
   said display device receiving a first event message from said personal input device, wherein said first event message is generated by said personal input device corresponding to an operation made by a user;
   said first processing unit processing said first event message to generate a first event parameter and updating graphical status of a cursor in a display picture of said display device, wherein said display picture is provided in a picture signal transmitted by an electronic device;
   said first processing unit processing said first event message to generate a second event message and transmitting said second event message to said electronic device; and
   said display device displaying said display picture and said updated graphical status of said cursor in said display picture;
   wherein while said first event message received by said display device indicates a movement of said personal input device, said first processing unit generates said first event parameter indicating said movement of said personal input device and updates graphical position of said cursor in said display picture of said display device corresponding to said first event parameter in real-time.

2. The method for driving personal input device of claim 1, further comprising steps of:
   said first processing unit acquiring a second event parameter according to said first event message;
   said first processing unit converting said second event parameter to said second event message according to a display data channel/command interface protocol; and
   said display device transmitting said second event message to said electronic device.

3. The method for driving personal input device of claim 2, further comprising a step of:
   said display device receiving said picture signal from said electronic device, wherein a second processing unit in said electronic device recovers said second event parameter from said second event message following said display data channel/command interface protocol and processing software programs in execution to generate said picture signal.

4. The method for driving personal input device of claim 1, further comprises steps of:
   determining if said first event parameter corresponds to an on-screen display menu; and
   if said first event parameter corresponds to said on-screen display menu, said first processing unit generating graphical information of said on-screen display menu in said display picture corresponding to said first event parameter.

5. The method for driving personal input device of claim 1, wherein said first event message includes a device descriptor, a configuration descriptor, a string descriptor, an interface descriptor, and an endpoint descriptor to indicates said movement of said personal input device.

6. The method for driving personal input device of claim 1, wherein said first event parameter includes coordinate information of said cursor in said display picture to indicates said movement of said personal input device.

7. The method for driving personal input device of claim 1, wherein said personal input device is connected to said display device via a USB port, a parallel port, or a wireless communication transceiver.

8. The method for driving personal input device of claim 1, wherein said electronic device is a personal computer, a multimedia player, or a game console.

9. The method for driving personal input device of claim 1, wherein said second event message includes a button event, a cursor event, a scroll-wheel event, and a control event.

10. The method for driving personal input device of claim 4, wherein said on-screen display menu includes options of display settings for the display picture and a display region of the on-screen display menu in the display picture.

11. A display device, comprising:
    a display panel;
    an input device connector; and
    a first processing unit, connected electrically to said display panel and said input device connector, driving a personal input device connected to said input device connector and receiving a first event signal generated by said personal input device via said input device connector;
    wherein said first processing unit receives a picture signal from an electronic device and said picture signal including graphical status of a cursor controlled by said personal input device;
    wherein said first processing unit processes said first event message of said personal input device to generate a first event parameter and updates the graphical status of the cursor in said picture signal according to said first event parameter, and said first processing unit outputs said updated picture signal to said display panel for displaying;
    wherein said first processing unit processes said first event message to generate a second event message and transmits said second event message to said electronic device;
    while said first event message received by said display device indicates a movement of said personal input device, said first processing unit generates said first event parameter indicating said movement of said personal input device and updates graphical position of said cursor in said display picture of said display device corresponding to said first event parameter in real-time.

12. The display device of claim 11, wherein said first processing unit acquires a second event parameter according to said first event message and converts a second event parameter to said second event message according to a display data channel/command interface protocol.

13. The display device of claim 12, wherein said picture signal is generated by a second processing unit in said electronic device, said second processing unit recovers said second event parameter from said second event message and processes said second event parameter with software programs in execution to generate said picture signal.

14. The display device of claim 11, wherein said first processing unit determines if said first event parameter corresponds to an on-screen display menu, and said first processing unit generates graphical information of said on-screen display menu in said display picture corresponding to said first event parameter if said first event parameter corresponds to said on-screen display menu.

15. The display device of claim 11, wherein said first event message includes a device descriptor, a configuration descriptor, a string descriptor, an interface descriptor, and an endpoint descriptor to indicate said movement of said personal input device.

16. The display device of claim 11, wherein said first event parameter includes coordinate information of said cursor in said display picture to indicates said movement of said personal input device.

17. The display device of claim 11, wherein said input device connector is a USB port, a parallel port, or a wireless communication transceiver.

18. The display device of claim 11, wherein said electronic device is a personal computer, a multimedia player, or a game console.

19. The display device of claim 11, wherein said second event message includes a button event, a cursor event, a scroll-wheel event, and a control event.

20. The display device of claim 14, wherein said on-screen display menu includes options of display settings for the display picture and a display region of the on-screen display menu in the display picture.

* * * * *